United States Patent
Lee

(10) Patent No.: US 7,651,439 B2
(45) Date of Patent: Jan. 26, 2010

(54) METHOD FOR CONTROLLING SKIP DOWN SHIFT OF AUTOMATIC TRANSMISSION FOR VEHICLE

(75) Inventor: Heeyong Lee, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 452 days.

(21) Appl. No.: 11/592,500

(22) Filed: Nov. 3, 2006

(65) Prior Publication Data

US 2008/0064566 A1    Mar. 13, 2008

(30) Foreign Application Priority Data

Sep. 8, 2006    (KR)    ........................ 10-2006-0087022

(51) Int. Cl.
*B60W 10/04* (2006.01)
*F16H 59/74* (2006.01)

(52) U.S. Cl. .................... 477/111; 477/109; 477/102

(58) Field of Classification Search .................. 477/107, 477/109, 111, 124, 101, 102; 701/55, 56
See application file for complete search history.

(56) References Cited

U.S. PATENT DOCUMENTS

| | | | | |
|---|---|---|---|---|
| 5,562,567 A | * | 10/1996 | Koenig et al. | ................. 477/54 |
| 6,616,574 B2 | * | 9/2003 | Jeon | ........................... 477/109 |
| 6,656,087 B1 | * | 12/2003 | Runde et al. | ................ 477/107 |
| 7,347,805 B2 | * | 3/2008 | Iriyama et al. | ............. 477/102 |
| 7,470,212 B2 | * | 12/2008 | Inagaki et al. | ............... 477/111 |

FOREIGN PATENT DOCUMENTS

| | | | | |
|---|---|---|---|---|
| JP | 05180321 A | * | 7/1993 | ................. 477/102 |
| KR | 10-2006-0056150 A | | 5/2006 | |

* cited by examiner

*Primary Examiner*—Roger Pang
(74) *Attorney, Agent, or Firm*—Edwards Angell Palmer & Dodge LLP; Peter F. Corless

(57) ABSTRACT

Disclosed is a method for controlling a skip down shift of an automatic transmission including a clutch to one-way clutch mechanism, a primary shift portion and a secondary shift portion by synchronizing the secondary shift portion to a target shift-speed through an engine torque reduction control.

13 Claims, 3 Drawing Sheets

METHOD FOR CONTROLLING SKIP DOWN SHIFT OF AUTOMATIC TRANSMISSION FOR VEHICLE

CROSS-REFERENCE TO RELATED APPLICATION

This application claims priority to and the benefit of Korean Patent Application No. 10-2006-0087022 filed in the Korean Intellectual Property Office on Sep. 8, 2006, the entire contents of which are incorporated herein by reference.

BACKGROUND OF THE INVENTION (a) Field of the Invention

The present invention relates to a method for controlling a skip down shift of an automatic transmission including a clutch to one-way clutch mechanism, a primary shift portion and a secondary shift portion. More particularly, the present invention relates to a method for controlling a skip down shift of an automatic transmission by synchronizing the secondary shift portion to a target shift-speed through an engine torque reduction control.

(b) Background

Generally, in an automatic transmission, a target shift-speed is determined by a map table of shift patterns predetermined corresponding to an opening change of a throttle valve and a vehicle speed.

Then, operational elements of a mechanism including an on-coming clutch and an off-going clutch are operated by a duty control of hydraulic pressure.

Therefore, a shift speed to the target shift-speed is automatically realized and driving convenience is supplied.

A control logic of a down shift before a vehicle stops is predetermined in the automatic transmission.

An object for controlling the down shift before the vehicle stops is to improve accelerating performance and drivability by increasing a gear ratio when the vehicle is re-accelerated in a case that the vehicle slows down.

A shift control before a vehicle stops of an automatic transmission having a clutch to clutch mechanism includes a power-on down shift and a power-off down shift corresponding to a power state.

A shift control before a vehicle stops of an automatic transmission having a clutch to one-way clutch mechanism includes only a power-on down shift.

Generally, an automatic transmission having the clutch to one-way clutch mechanism can operate the power-on down shift control without additional elements in a low speed area, and so shift feel and drivability are satisfied.

However, if a multiple skip down shift occurs before the vehicle stops in a high speed area, because the automatic transmission is seriously affected by a deviation of a control system and an engine idle rotation speed, a problem occurs that shift feel is deteriorated.

In addition, if a tip-in occurs during the skip down shift, a problem occurs that serious shift shock occurs.

The above information disclosed in this Background section is only for enhancement of understanding of the background of the invention and therefore it may contain information that does not form the prior art that is already known in this country to a person of ordinary skill in the art.

SUMMARY OF THE INVENTION

In one aspect, the present invention provides a method for controlling a skip down shift of an automatic transmission including a clutch to one-way clutch mechanism, a primary shift portion and a secondary shift portion by synchronizing the secondary shift portion to a target shift-speed through an engine torque reduction control.

In another aspect, the present invention provides a method for controlling a skip down shift of an automatic transmission including a clutch to one-way clutch mechanism, a primary shift portion and a secondary shift portion, the method comprising the steps of: (a) determining if a request for a multiple skip down shift is detected in a high speed driving condition; (b) determining a target shift-speed and exhausting hydraulic pressure supplied to the off-going clutch of the secondary shift portion when a request for a multiple skip down shift is detected; and (c) synchronizing the secondary shift portion to the target shift-speed through an engine torque reduction control.

In another aspect, motor vehicles are provided that comprise an automatic transmission controlled by a described method.

It is understood that the term "vehicle" or other similar term as used herein is inclusive of motor vehicles in general such as passenger automobiles, buses, trucks, various commercial vehicles, and the like.

Other aspects of the invention are discussed infra.

Figure 1:
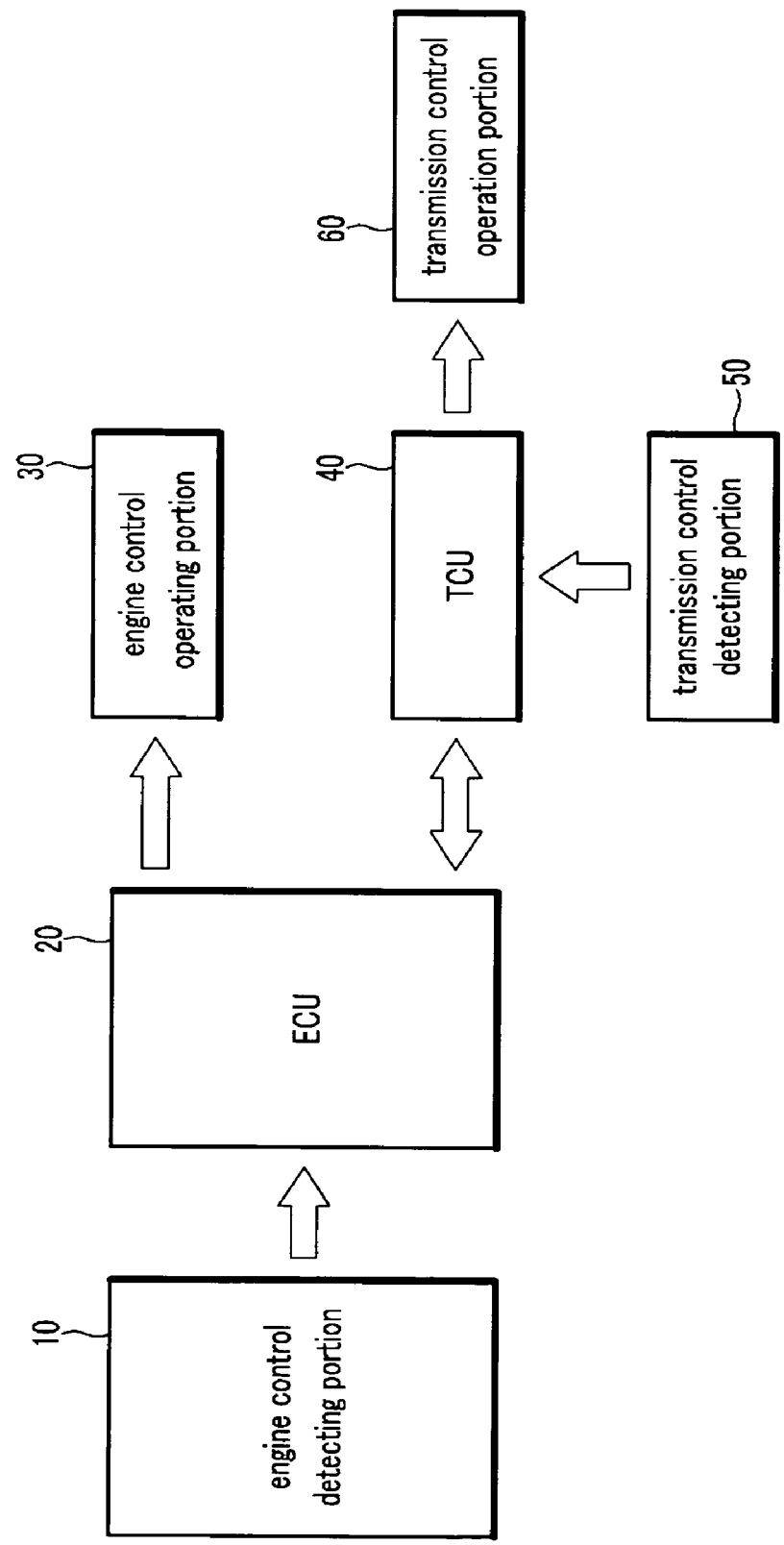
FIG. 1 is a schematic diagram of a shift control apparatus of an automatic transmission according to an exemplary embodiment of the present invention.

Reference numerals set forth in the Drawings includes reference to the following elements as further discussed below:

10: engine control detecting portion
20: ECU
30: engine control operating portion
40: TCU
50: shift control detecting portion
60: shift control operating portion

DETAILED DESCRIPTION

As discussed above, the present invention provides a method for controlling a skip down shift of an automatic transmission including a clutch to one-way clutch mechanism, a primary shift portion and a secondary shift portion by synchronizing the secondary shift portion to a target shift-speed through an engine torque reduction control.

Preferably, subsequent to the engine torque reduction control, a hydraulic control of the off-coming and on-going clutches of the primary shift portion can be conducted.

A preferred engine torque reduction control may preferably comprise an ignition timing retardation.

Another preferred engine torque reduction control may be suitably determined by a pattern map corresponding to respective target shift-speeds.

Suitably, the control pattern may be determined such that turbine speed is convergent to a target turbine speed.

In a preferred embodiment, engine torque reduction control may suitably comprise an open loop control or a feedback control such that engine speed and turbine speed are maintained at a predetermined ratio.

In another aspect, the present invention provides a method for controlling a skip down shift of an automatic transmission including a clutch to one-way clutch mechanism, a primary shift portion and a secondary shift portion, the method comprising the steps of: (a) determining if a request for a multiple skip down shift is detected in a high speed driving condition; (b) determining a target shift-speed and exhausting hydraulic pressure supplied to the off-going clutch of the secondary shift portion when a request for a multiple skip down shift is detected; and (c) synchronizing the secondary shift portion to the target shift-speed through an engine torque reduction control.

A preferred method of the present invention may further suitably comprise the steps of: (a) exhausting the hydraulic pressure of the off-going clutch of the primary shift portion subsequent to the engine torque reduction control, and realizing a target shift-speed by supplying a hydraulic pressure to the on-coming clutch of the primary shift portion; (b) determining if turbine speed is up to a target turbine speed; and (c) exhausting the hydraulic pressure of the off-going clutch of the primary shift portion when turbine speed is up to the target turbine speed.

As discussed above, engine torque reduction control may preferably comprise an ignition timing retardation. Also preferably, a pattern map corresponding to respective target shift-speeds may determine engine torque reduction control. Suitably, the control pattern may be determined such that turbine speed is convergent to a target turbine speed.

A preferred engine torque reduction control may suitably comprise an open loop control or a feedback control such that engine speed and turbine speed are maintained at a predetermined ratio.

In another preferred embodiment, methods of the present invention may further comprise the steps of: (a) returning engine torque to an original state by completing the engine torque reduction control when the synchronization of the target shift-speed is completed; and (b) completing a duty control of the on-coming clutch and off-going clutch of the primary shift portion.

Preferably, when the off-going clutch of the secondary shift portion is released, a control of the on-coming clutch of the primary shift portion may start.

Also preferably, off-going clutch of the primary shift portion may continue its releasing control performance to a synchronizing point so as to prevent the turbine speed from excessively increasing.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIG. 1 is a schematic diagram of a shift control apparatus of an automatic transmission according to an exemplary embodiment of the present invention.

As shown in FIG. 1, an engine control detecting portion 10 equipped with various kinds of sensors detects signals from the sensors and transmits information with respect to driving status of a vehicle to an engine control unit (ECU) 20.

The ECU 20 analyzes the information by comparing with predetermined standard data and controls the engine to be in an optimal condition by an engine control operating portion 30.

Simultaneously, the ECU 20 transmits information necessary for shift control to a transmission control unit (TCU) 40 such that a shift control is realized.

At that time, the TCU 40 controls a shift control operating portion 60 by comparing the information input from the ECU 20 and the shift control detecting portion 50 with the predetermined standard data for the shift control in order to achieve an optimal shift control.

Because the standard data are obvious to a person of an ordinary skill in the art, detailed descriptions thereof are omitted herein.

The engine control detecting portion 10 includes various kinds of sensors to detect all of the information necessary for the engine control, such as an accelerator position sensor, a throttle position sensor, a turbine speed sensor, a vehicle speed sensor, a crank angle sensor, an engine speed sensor, a coolant temperature sensor, and so on.

The shift control detecting portion 50 includes various kinds of sensors to supply information necessary for the shift control, such as an input and output speed sensor, a lubrication temperature sensor, an inhibitor switch, "+" and "−" tip of a sport mode, a brake switch, and so on.

In addition, an engine control operating portion 30 includes all of the operating portions for the engine control. According to an exemplary embodiment of the present invention, it may be a fuel system.

The shift control operating portion 60 includes all of the solenoid valves applied to hydraulic pressure control apparatuses of the automatic transmission. According to an exemplary embodiment of the present invention, it may include on-coming and off-going solenoid valves.

In addition, a method for communicating between the ECU 20 and the TCU 40 is realized as a controlled area network (CAN) communication or a serial communication.

Figure 2:
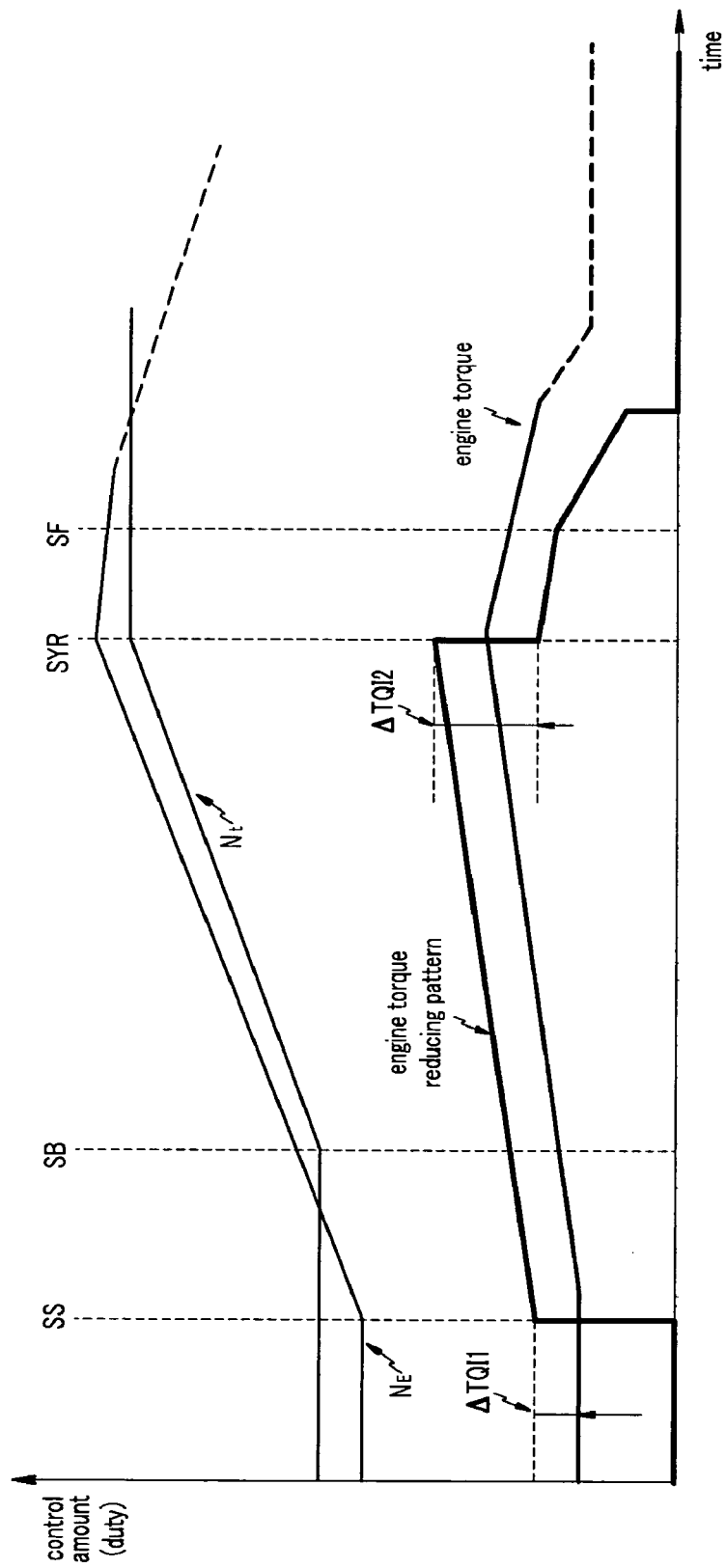
FIG. 2 is a control pattern diagram of a shift control apparatus of an automatic transmission according to an exemplary embodiment of the present invention.
Figure 3:
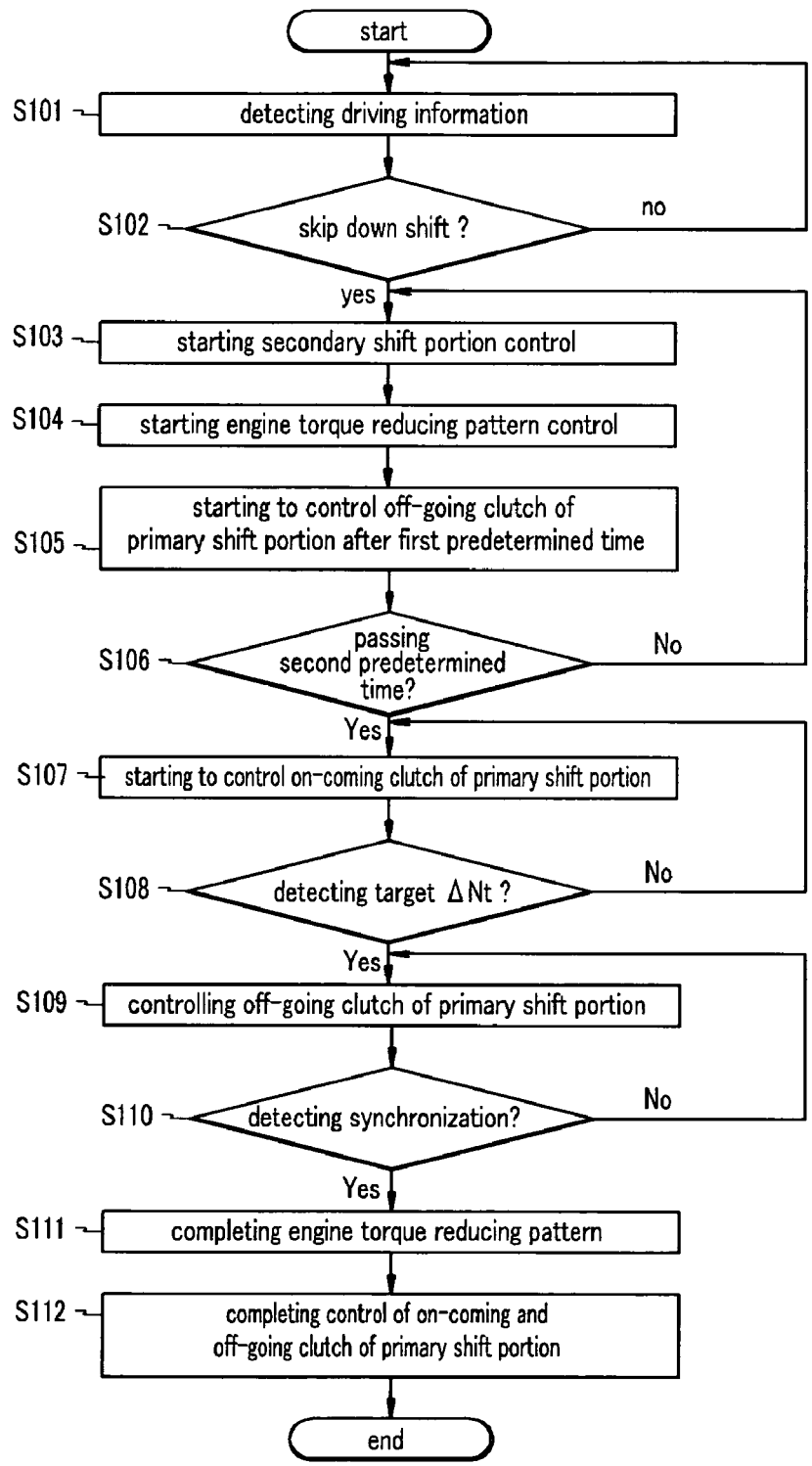
FIG. 3 is a flowchart showing a method for controlling a skip down shift of an automatic transmission according to an exemplary embodiment of the present invention.

Referring to FIG. 2 and FIG. 3, according to an exemplary embodiment of the present invention, an operation of a multiple skip down shift is described hereinafter.

The TCU 40 detects and analyzes a present shift speed on the basis of engine control information input from the ECU 20 and shift control information input from the shift control detecting portion 50 at step S101 in a state that the automatic transmission drives at any shift speed.

The primary shift portion and the secondary shift portion include planetary gear sets utilized in the automatic transmission, and a shift speed is realized by operations of the primary shift portion and the secondary shift portion.

Then, the TCU 40 determines if a skip down shift will start at step S102 on the basis of information analyzed at the step S101.

If the skip down shift is started, the TCU 40 operates a releasing control exhausting hydraulic pressure at step S103 by controlling a duty of an off-going clutch of the secondary shift portion.

The duty control of the off-going clutch of the secondary shift portion releases the clutch of the secondary shift portion by rapidly controlling the hydraulic pressure of the off-going clutch.

At that time, the ECU 20 may suitably operate an engine torque reduction control of a predetermined pattern as a method of ignition timing retardation corresponding to a signal of the TCU 40.

That is, the ECU 20 may control an engine such that a turbine speed can be convergent to a target turbine speed at step S104.

The engine torque reduction control may suitably utilize the method of ignition timing retardation, and a map value may be utilized when the off-going clutch of the secondary shift portion and the off-going clutch of the primary shift portion are released.

That is, the TCU 40 maintains the engine torque reduction control by a feedback control or an open loop control such that an engine speed, Ne, and a turbine speed, Nt, can be maintained at a predetermined ratio.

The map value, the feedback control, and the open loop control may be suitably utilized to control the automatic transmission and because they are obvious to a person of an ordinary skill in the art, detailed descriptions thereof are omitted herein.

The TCU 40 then determines if a first predetermined time passes. When the first predetermined time passes, the TCU 40 will exhaust the hydraulic pressure by controlling the duty of the off-going clutch of the primary shift portion at step S105.

Next, the TCU 40 determines if a second predetermined time passes at step S106.

A time gap is predetermined such that the off-going clutch control of the primary shift portion is released later than a point of releasing the off-going clutch of the secondary shift portion.

In addition, in order to improve a releasing control performance when the synchronization of the shift speed is completed, the duty of the off-going clutch may be maintained at a minimum value in an initial time of the shift speed.

And then, when the synchronization of the shift speed is completed in the primary shift portion, the duty is controlled such that the hydraulic pressure can be maintained at a releasing control value to a shift synchronizing point (SYR) in order to prevent an excessive increase of the turbine speed, Nt.

If the predetermined second time is not passed, the TCU 40 returns to the step S103.

If the duty control to the off-going clutch is maintained and the predetermined second time passes, the TCU 40 supplies the hydraulic pressure at step S107 by controlling the duty to the on-coming clutch of the primary shift portion in order to realize the target shift-speed of the skip down shift.

The duty control of the on-coming clutch of the primary shift portion starts the control of the duty pattern at a point that the off-going clutch of the secondary shift portion is released.

Then, the TCU 40 determines if a predetermined target rotation speed is realized by detecting a change of the turbine speed ANt at step S108.

If the target rotation speed is not realized, the TCU 40 returns to the step S107.

That is, the duty control of the on-coming clutch of the primary shift portion is successively maintained.

If a change of the turbine speed is up to the target rotation speed, the TCU 40 completely exhausts the hydraulic pressure at step S109 by controlling the duty control of the off-going clutch of the primary shift portion.

By the above-described control, the TCU 40 determines if the turbine speed, Nt, is up to a synchronizing point of the target shift-speed corresponding to a request of the skip down shift at step S110.

If the turbine speed, Nt, is up to the synchronizing point of the target shift-speed, the TCU 40 completes the engine torque reduction pattern control and simultaneously completes the duty control of the off-going clutch of the primary shift portion and the on-coming clutch at steps S111 and S112.

As described, according to an exemplary embodiment of the present invention, if a request of a multiple skip down shift exists, an engine torque reduction control utilizing the method of ignition timing retardation is applied.

That is, because a down shift before a vehicle stops is realized when the engine speed is convergent with a target turbine speed, a more stable shift feel and shift responsiveness can be attained by improving gearing performance between the secondary shift portion and the primary shift portion.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A method for controlling a skip down shift of an automatic transmission including a clutch to one-way clutch mechanism, a primary shift portion and a secondary shift portion by synchronizing the secondary shift portion to a target shift-speed through an engine torque reduction control,
    wherein the engine torque reduction control is determined by a pattern map corresponding to respective target shift-speeds.

2. The method of claim 1, wherein subsequent to the engine torque reduction control, a hydraulic control of the off-coming and on-going clutches of the primary shift portion is conducted.

3. The method of claim 1, wherein the engine torque reduction control comprises an ignition timing retardation.

4. The method of claim 1, the control pattern is determined such that turbine speed is convergent to a target turbine speed.

5. The method of claim 1, wherein the engine torque reduction control comprises an open loop control or a feedback control such that engine speed and turbine speed are maintained at a predetermined ratio.

6. A method for controlling a skip down shift of an automatic transmission including a clutch to one-way clutch mechanism, a primary shift portion and a secondary shift portion, the method comprising the steps of:
    (a) determining if a request for a multiple skip down shift is detected in a high speed driving condition;
    (b) determining a target shift-speed and exhausting hydraulic pressure supplied to the off-going clutch of the secondary shift portion when a request for a multiple skip down shift is detected; and
    (c) synchronizing the secondary shift portion to the target shift-speed through an engine torque reduction control, wherein the engine torque reduction control is determined as a pattern map corresponding to respective target shift-speeds.

7. The method of claim 6, further comprising the steps of:
    (a) exhausting the hydraulic pressure of the off-going clutch of the primary shift portion subsequent to the engine torque reduction control, and realizing a target shift-speed by supplying a hydraulic pressure to the on-coming clutch of the primary shift portion;
    (b) determining if turbine speed is up to a target turbine speed; and
    (c) exhausting the hydraulic pressure of the off-going clutch of the primary shift portion when turbine speed is up to the target turbine speed.

8. The method of claim 6, wherein the engine torque reduction control comprises an ignition timing retardation.

9. The method of claim 6, wherein the control pattern is determined such that turbine speed is convergent to a target turbine speed.

10. The method of claim 6, wherein the engine torque reduction control comprises an open loop control or a feedback control such that engine speed and turbine speed are maintained at a predetermined ratio.

11. The method of claim 7, further comprising the steps of:
(a) returning engine torque to an original state by completing the engine torque reduction control when the synchronization of the target shift-speed is completed; and
(b) completing a duty control of the on-coming clutch and off-going clutch of the primary shift portion.

12. The method of claim 7, wherein a control of the on coming clutch of the primary shift portion is started* when the off-going clutch of the secondary shift portion is released.

13. The method of claim 7, wherein the off-going clutch of the primary shift portion maintains performance of a releasing control to a synchronizing point so as to prevent the turbine speed from excessively increasing.

* * * * *